Nov. 6, 1934.   H. T. HUNTER   1,979,553
APPARATUS FOR COOLING BAKERY PRODUCTS
Filed April 8, 1931   5 Sheets-Sheet 4
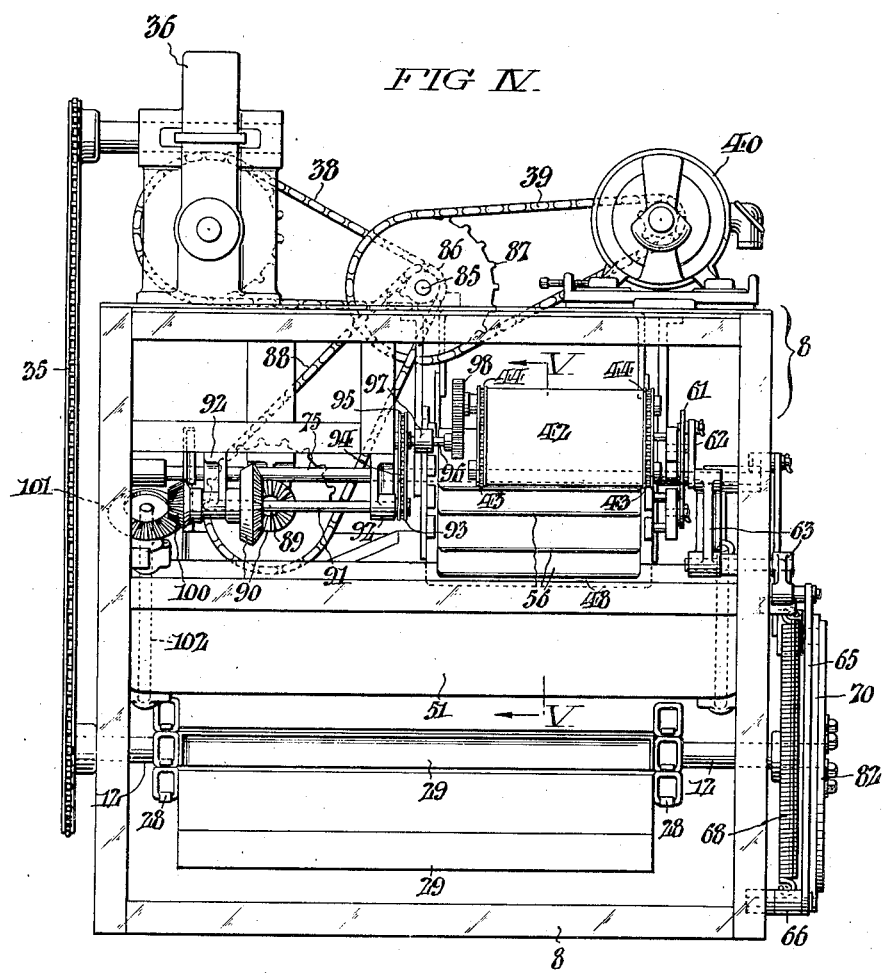
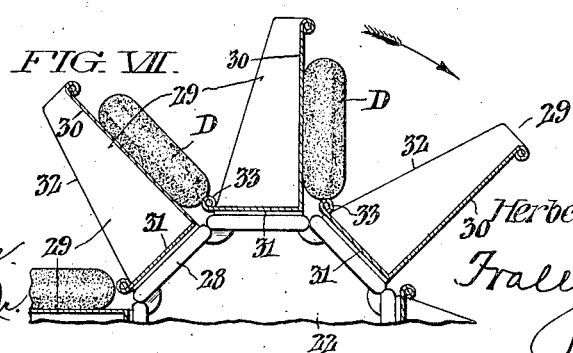
WITNESSES
INVENTOR.
Herbert T. Hunter;
ATTORNEY.

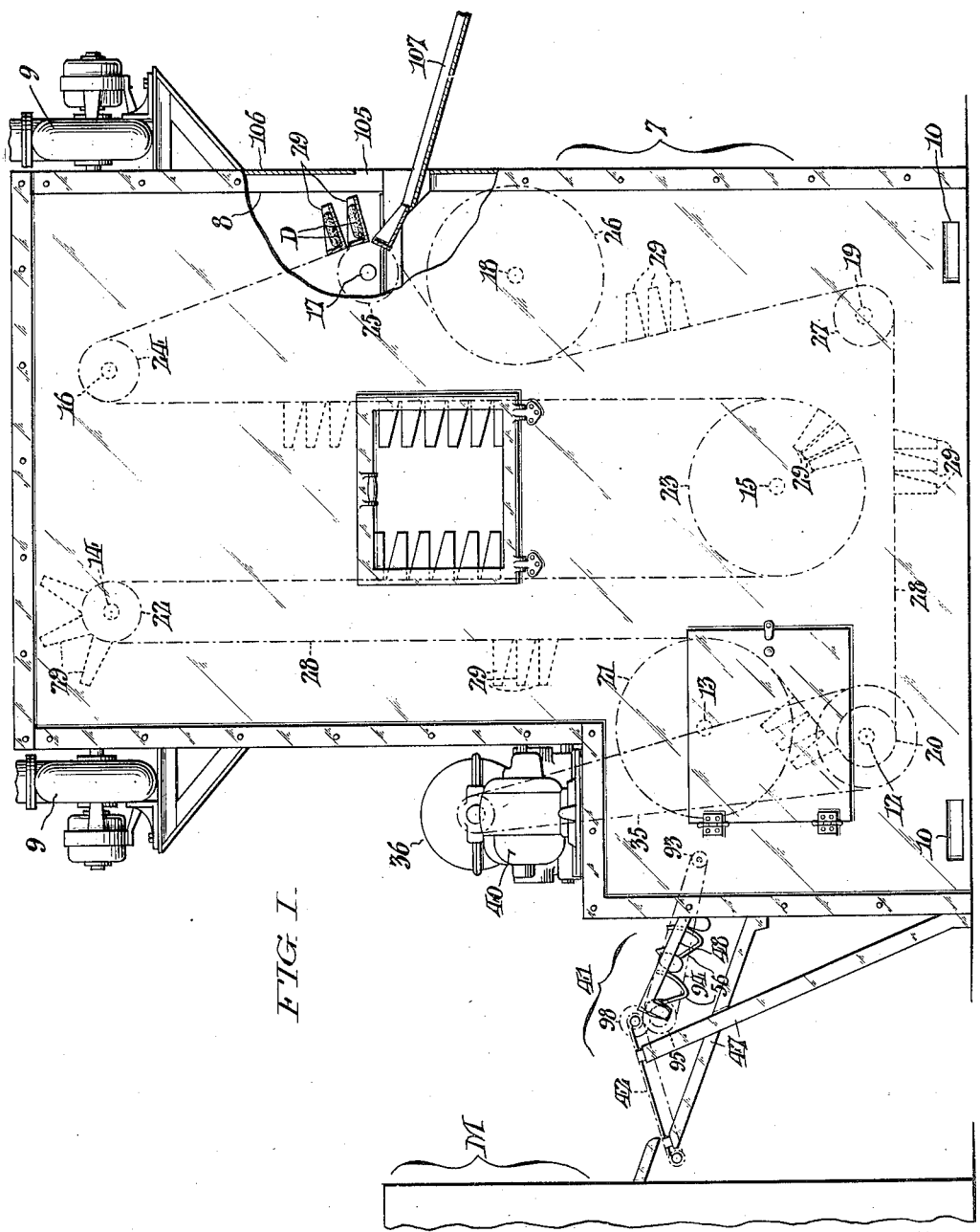

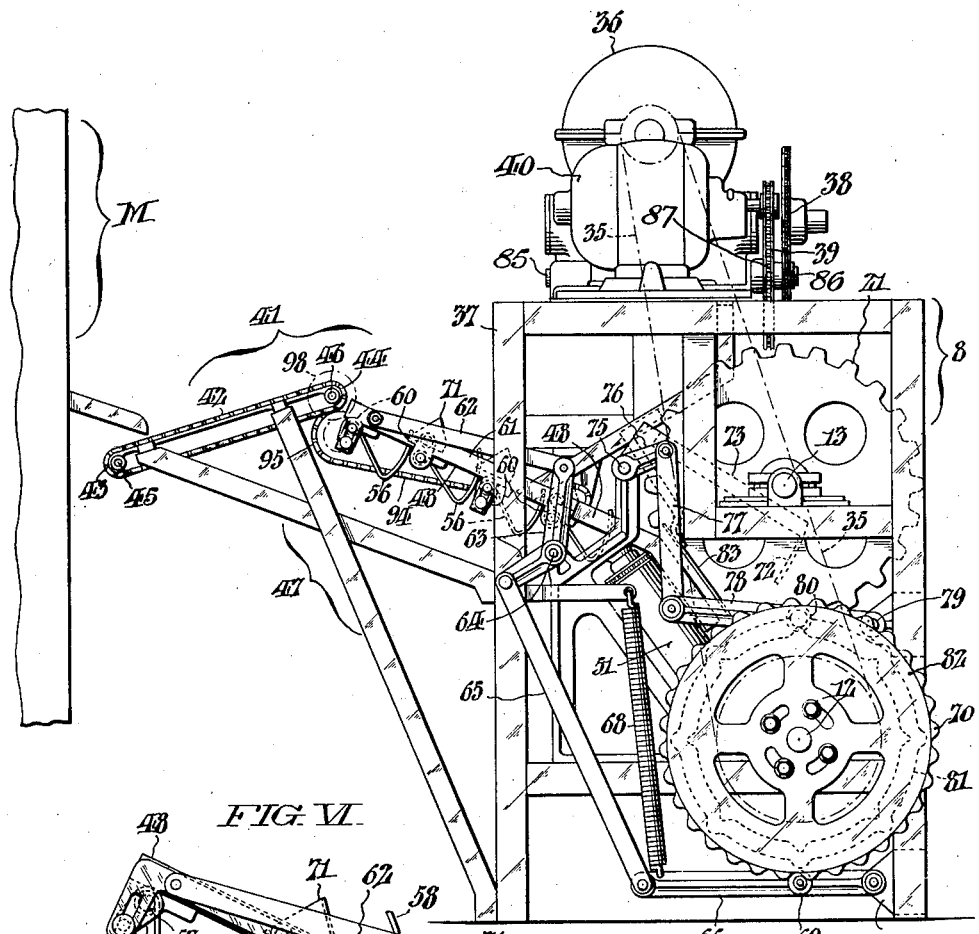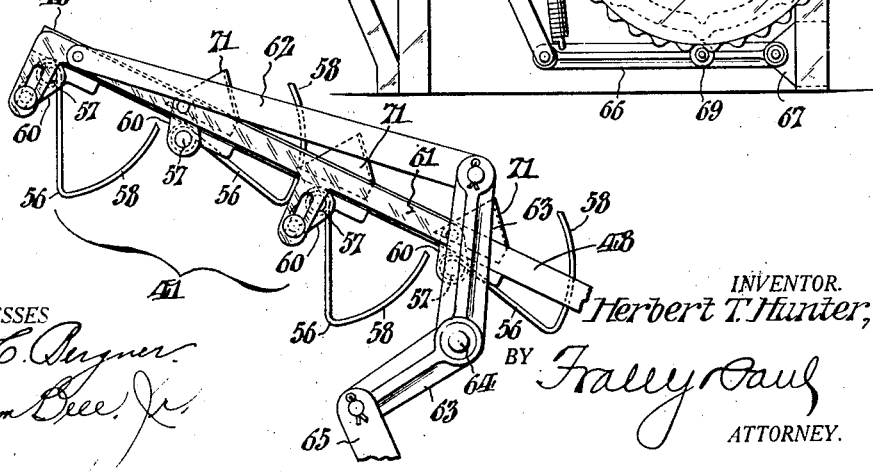

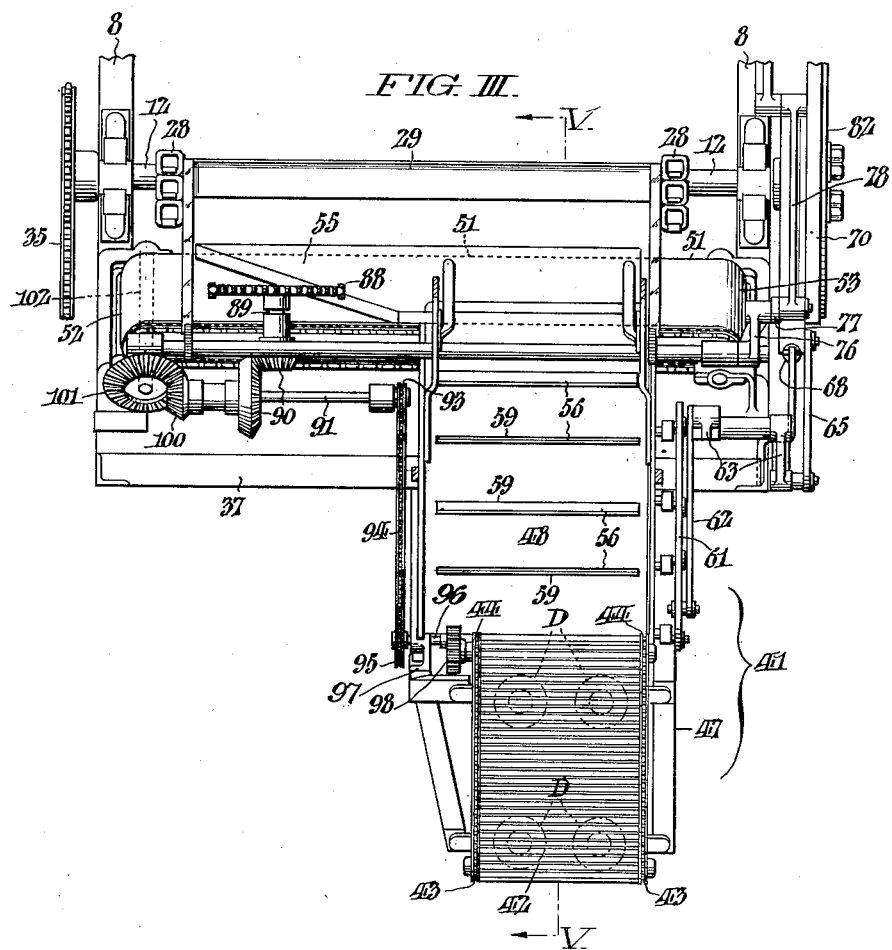

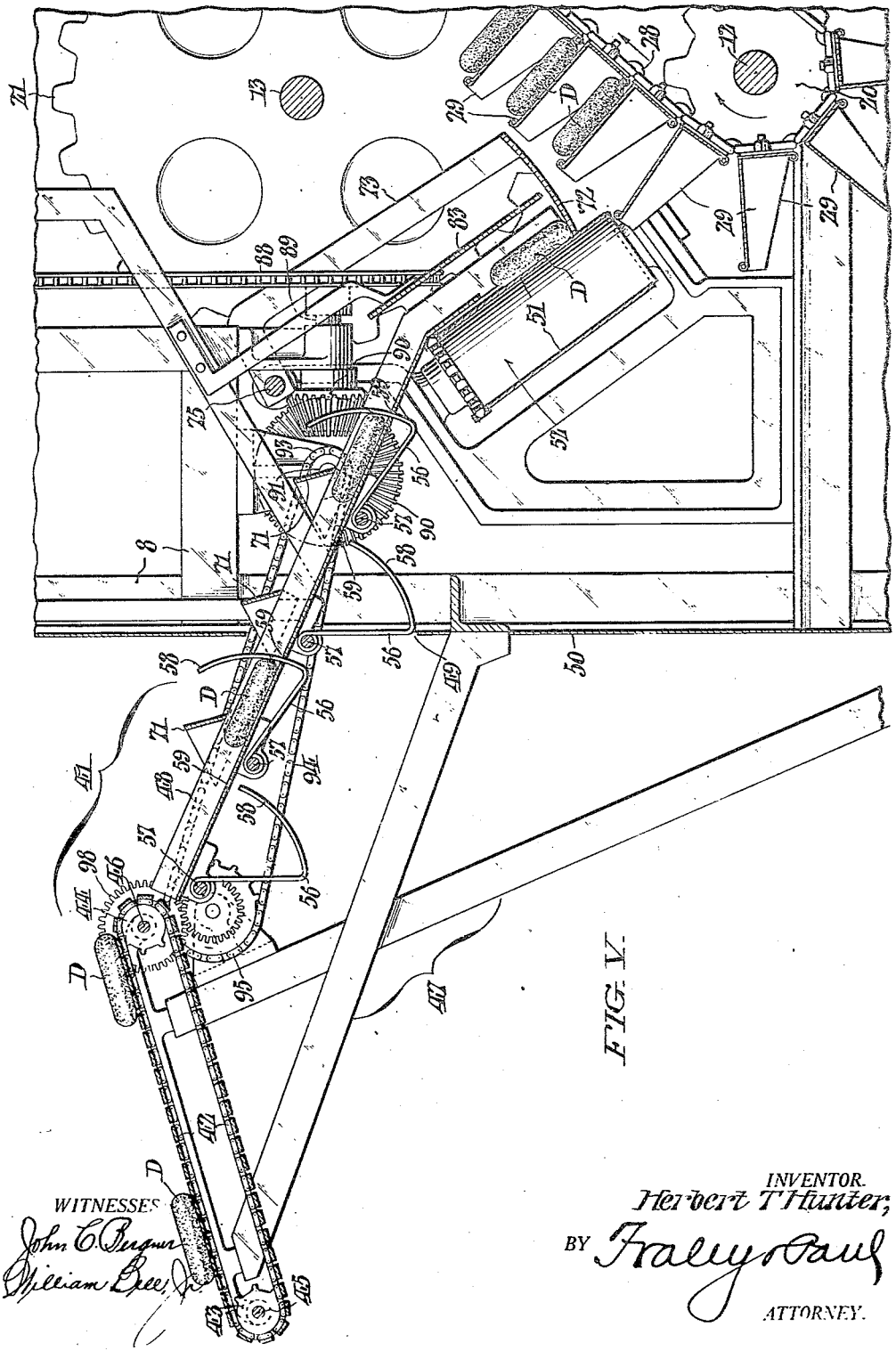

Patented Nov. 6, 1934

1,979,553

UNITED STATES PATENT OFFICE 1,979,553

APPARATUS FOR COOLING BAKERY PRODUCTS

Herbert T. Hunter, Baltimore, Md., assignor to Doughnut Machine Corporation, New York, N. Y., a corporation of New York Application April 8, 1931, Serial No. 528,583

13 Claims. (Cl. 34—12)

This invention relates to apparatus for cooling bakery products, particularly doughnuts and the like.

In the main my invention is directed toward provision of a simple, compact, reliable and continuously operating apparatus capable of receiving fresh cooked doughnuts from an automatic producing machine and of rapidly and effectively cooling them in readiness for sugaring and packing, with attendant elimination of intermediate handling and the likelihood of contamination of the product.

In connection with cooling apparatus of the indicated sort embodying a conveyor with crosswise carrier trays for the doughnuts, it is a further object of my invention to provide feed mechanism to receive the fresh cooked doughnuts from the producing machine and to maintain them in definite separation for distribution along the length of the conveyor trays as the latter are successively presented.

A further aim of my invention is to provide for periodically turning the doughnuts over for exposure of their opposite sides to cooling influence incident to progression by the conveyor.

Still another object of my invention is to provide means whereby, as the conveyor trays angularly separate and approach each other in turning sprockets, the doughnuts are restrained to turn on edge and thereby insured against being crushed.

How the foregoing as well as other objects and attendant advantages may be readily attained in practice will be manifest from the following detailed description of the accompanying drawings whereof Fig. I shows, in side elevation, a doughnut cooling apparatus conveniently embodying my invention.

Fig. II is a side elevation of the receiving end of the apparatus with the casing removed, and drawn to a larger scale than in Fig. I.

Fig. III is a plan view of the receiving end of the apparatus.

Fig. IV is a front elevation of the receiving end of the apparatus.

Fig. V is a fragmentary longitudinal sectional view taken as indicated by the arrows V—V in Figs. III and IV, and drawn to a still larger scale.

Fig. VI is a fragmentary view showing the details of stop means associated with the feed mechanism of the apparatus; and, Fig. VII is a detail view showing the action of the means relied on to cause the doughnuts to be positively turned on edge incident to progression by the conveyor.

As herein delineated, my doughnut cooling apparatus comprises a casing or enclosure 7 of sheet metal which encloses a frame work 8 built, in the present instance, from structural iron. Air is constantly circulated vertically through the enclosure 7 by two suction blowers 9 connecting into the ends of the enclosure at the top, ingress of the air being by way of bottom openings indicated at 10 in Fig. I. At different elevations, the framework 8 supports appropriate bearings for transverse shafts 12—19, respectively carrying pairs of laterally spaced conveyor sprocket wheels 20—27, which define a circuitous course for sprocket chains 28 up and down within the enclosure 7. Extending crosswise between opposite links of the chains 28 are carrier trays 29 for the doughnuts which latter are conventionally designated D. These carrier trays 29 form a cooling conveyor for the doughnuts D and are made from sheet metal with shelf portions 30 at right angles to flanges 31, whereby they are attached to the links of the sprocket chains 28, as well as with end wall portions 32. Due to this arrangement it will be seen that as the conveyor rounds the sprockets 22, 23, 24, the doughnuts D are transferred between contiguous trays 29 and concurrently turned over so that their opposite sides are alternately exposed to the cooling influence of circulated air several times during progression through the enclosure 7. As shown in Fig. VII, the end wall portions 32 of the carrier trays 29 are formed with rounded edges or beads 33 which function as heels to restrain the doughnuts D and to cause them to turn on edge as they are transferred from one tray to another in the direction of travel of the conveyor. By being so restrained, the doughnuts D are prevented from falling horizontally between contiguous trays 29 and being crushed as said trays separate and approach each other angularly in moving around the upper sprockets 22, 24. The cooling conveyor is driven slowly and continuously, through the medium of a sprocket chain connection 35, from a speed reduction gear unit 36 mounted on an offset 37 of the structural frame 8 at the receiving end of the apparatus. The speed reduction gear unit 36 in turn derives motion through serial sprocket chains 38, 39 from an electric motor 40 also supported on the offset 37 of the frame 8.

At M in Figs. I and II, I have partly illustrated an automatic doughnut cooking machine from which freshly cooked doughnuts D are successively ejected, said machine being so positioned as to deliver the doughnuts D to the feeding mechanism of the cooling apparatus, comprehensively designated by the numeral 41. This feeding mechanism 41 includes a slatted belt 42 which is confined to a substantially horizontal circuit by sprockets 43, 44, whereof the shafts 45, 46 are rotatably supported by a bracket 47 reaching forwardly from the offset 37 of the frame 8. From the delivery end of the slatted belt 42 the doughnuts D drop onto a downwardly inclined gravity chute 48 by which they are conducted, through an opening 49 in the end wall 50 of the enclosure 7, to an inclined endless belt 51, which is trained about spaced pulleys 52, 53 (Figs. III, IV and V), so as to move transversely of the cooling conveyor at the region where the trays 29 of the latter round the sprocket wheels 20. From Fig. III it will be observed that the lower or discharging portion of the gravity chute 46 is broadened, as at 55, to the full width of the cooling conveyor, to enable distribution of the doughnuts D along the length of the carrier trays 29 by the transversely moving belt 51 in a manner later on explained.

In order to control the doughnuts D, I provide means for arresting them at intervals as they slide by gravity down the chute 48. This means comprises stops 56 whereof there are four in the present instance, the same being fashioned from sheet metal to angular cross-sectional configuration and secured to rock shafts 57 with journal support in bearings at the underside of the chute 48, see Figs. V and VI more particularly. The perpendicular portions 58 of the stops 56 are curved concentrically with respect to the shafts 57 for capacity to move up and down in narrow transverse slots 59 in the chute 48. At the ends nearest the observer in Fig. VI, the shafts 57 for the stops 56 are fitted with short crank arms 60, the first and third of said crank arms projecting downward, and the other two, upward. The crank centers of the arms 60 are joined by a connecting bar 61, which, through a link 62, is coupled with a bell crank lever 63 fulcrumed to swing on a fixed center 64, see Fig. II. The bell crank lever 63 is in turn coupled, by means of a vertical link 65, with a horizontal arm 66 pivoted on a bracket 67 of the frame 8. The arm 66 is subject to a tension spring 68, and carries a roller 69 which runs in contact with the scalloped periphery of a rotary cam 70 secured, with capacity for adjustment, on the conveyor sprocket shaft 12. With this arrangement it will be evident that as the high points of the rotary cam 70 pass the roller 69 of the arm 66, the first and third of the stops 56 will be projected up through the chute 48 and the second and fourth retracted, and vice versa, periodically so that fall of the doughnuts D on the chute 48 is progressively checked while they are enroute to the distributing belt 51. The doughnuts D are thereby not only protected against injury, but maintained in definite separation to facilitate their subsequent distribution. Guards 71, also of sheet metal, respectively associated with the first three of the stops 56, bridge the chute 48 and define underlying clearances just large enough for passage of the doughnuts D singly with preclusion of their piling one on top of another as they move between the stops 56.

Another stop shown at 72 in Fig. V, serves to detain the doughnuts D on the distributing belt 51 until a definite number of them are collected thereon for discharge en masse onto the successively passing trays 29 of the cooling conveyor. The stop 72 is suspended by means of side arms 73 from a shaft 75 supported for rocking movement in fixed bearings of the frame 8. At that end visible in Fig. II, and at the right of Fig. III, the shaft 75 is fitted with an arm 76 which is coupled by a drop link 77 with a roller arm 78 having fulcrum attachment on the frame 8 at 79. The roller 80 of the arm 79 runs in the side groove 81 of another rotary cam 82 on the conveyor sprocket shaft 12, and as a consequence of this cooperation, the stop 72 is periodically moved into and out of active position with respect to the chute 48 to release the collected doughnuts D into the conveyor trays 29 successively presented to the transfer belt 51. It is to be particularly noted that the groove deviations of the cam 82 are less in number than the peripheral rises of the cam 70, the ratio in the present instance being such as to predetermine the allotment of eight doughnuts to each conveyor tray 29. In order to preclude turning over and rolling of the doughnuts D out of control immediately after release by the last of the four preliminary stops 56, a stationary guard plate 83 is placed over the chute 48 in the region of the transfer belt 51.

The initial or slatted belt 42 and the transfer belt 51 of the feed mechanism 41 are driven at the proper relative speeds by transmission instrumentalities as follows: As shown in Figs. II and IV, there is a shaft 85 at the top of the offset 37 of the frame 8 which is common to the sprockets 86 and 87 of the serial chains 38 and 39 hereinbefore mentioned. Through a sprocket chain 88, Figs. III and IV, the shaft 85 communicates motion to a shaft 89 at a lower level in the frame; and through a bevel gear couple 90 the motion is further communicated to a transverse shaft 91 rotatably supported in fixed bearings 92. At one end the shaft 91 carries a sprocket pinion 93 which is connected by a chain 94 with a sprocket 95 on a short shaft 96 that revolves in a bearing 97 on the bracket extension 47 of the frame 8, and from thence movement is imparted through a pair of intermeshing spur gears 98 to the shaft 46 of the sprocket 44 of the initial slatted belt 42. Referring again to the shaft 91 in Fig. IV, a pinion 100 at the left hand end thereof meshes with a bevel gear 101 on the diagonal shaft 102 of one of the pulleys 52 of the transfer belt 51, see Fig. III.

As the carriers 29 on the cooling conveyor chains 28 round the sprockets 25 (Fig. I), the cooled doughnuts D are discharged from the apparatus through an opening 105 in the right hand end wall 106 onto a chute 107, by which they may be conducted either to a packing table or to a sugaring machine as may be desired.

Having thus described my invention, I claim:

1. Apparatus for cooling articles of flat formation such as doughnuts and the like, comprising a conveyor with crosswise carrier trays; and feed mechanism including inclined means movable transversely of the conveyor for delivering freshly cooked doughnuts in definite separation received from a producing machine and conducting them in like manner to individual conveyor trays, resting on one of their flat faces, upon successive presentation of said trays to the transversely moving means.

2. Apparatus for cooling articles of flat formation such as doughnuts and the like, comprising a conveyor with crosswise carrier trays; inclined means movable transversely of the conveyor; and mechanism controlling progression and intermittent gravitation of freshly cooked doughnuts in definite separation, from a producing machine, to the transversely moving means for corresponding delivery to individual conveyor trays, resting on one of their flat faces, upon successive presentation of said trays to the transversely moving means.

3. Apparatus for cooling articles of flat formation such as doughnuts and the like, comprising a conveyor with crosswise carrier trays; feed mechanism including an inclined belt moving transversely of the conveyor, and means for directing freshly cooked doughnuts from a producing machine, to the belt for delivery onto the conveyor carrier trays resting on one of their flat faces in definite separation upon successive presentation of said trays to the said belt.

4. Apparatus for cooling articles of flat formation such as doughnuts and the like, comprising a conveyor with crosswise carrier trays; and feed mechanism including an inclined belt moving transversely of the conveyor, means for directing freshly cooked doughnuts from a producing machine to the belt, means for temporarily detaining the doughnuts on the belt until a number of them are distributed along its length, and means for periodically actuating the detaining means to release the doughnuts onto the conveyor trays resting on one of their flat faces in definite separation upon successive presentation of said trays to the belt.

5. Apparatus for cooling articles of flat formation such as doughnuts and the like, comprising a conveyor with crosswise carrier trays coactive to periodically turn over the doughnuts incident to progression through the apparatus; inclined endless means moving transversely of the conveyor; and means for conducting freshly cooked doughnuts in definite separation from a producing machine to the said transversely moving means, for distribution along the length of the conveyor trays resting on one of their flat faces, upon successive presentation of said trays to the said transversely moving inclined endless means.

6. Apparatus for cooling articles of flat formation such as doughnuts and the like, comprising a conveyor with crosswise carrier trays coactive to periodically turn over the doughnuts incident to progression through the apparatus; feed mechanism including an endless belt moving transversely of the conveyor; a gravity chute for conducting fresh cooked doughnuts from a producing machine to the transversely moving belt aforesaid; intermittently operated annular-section stop means at intervals along the chute for progressively arresting gravitation of the doughnuts, thereby to check their fall and maintain them in definite separation; a periodically operating vertically-rockable member for detaining the doughnuts on the transversely moving belt until a number of them are distributed lengthwise thereof, and for thereafter releasing them onto the conveyor trays upon successive presentation of the latter; and means whereby operation of the aforesaid conveyor, the stop means and the detaining means are synchronized to render the process continuous with assurance against blocking of the apparatus.

7. Apparatus for cooling articles of flat formation such as doughnuts and the like, comprising a chain conveyor, and guide sprockets determining a circuitous course for the conveyor within the enclosure, the said conveyor having crosswise angle-section carrier trays with side flanges and transverse heads for restraining the doughnuts, said heads serving to periodically turn the doughnuts over on their edges and prevent them from being crushed incident to angular separation and approach of the carrier trays in rounding sprockets.

8. Apparatus for cooling articles of flat formation such as doughtnuts and the like, comprising a chain conveyor, and guide sprockets determining a vertical undulating course for the conveyor, said conveyor having crosswise angle-section carrier trays with flanges whereby they are attached to the conveyor chain links and bead edge heel portions about which the doughnuts are constrained to turn on edge and thereby prevented from being crushed incident to angular separation and approach of the trays in rounding sprockets.

9. Apparatus for cooling articles of flat formation such as doughnuts and the like, comprising a conveyor with angle-section carrier trays, each said tray embodying a bead-edge flange for causing the doughnuts to be periodically turned over incident to progression by the conveyor.

10. Apparatus for cooling articles of flat formation such as doughtnuts and the like, comprising a conveyor with a multiplicity of transverse angle-section carrier trays, each embodying a bead-edge flange, said bead edge causing the doughnuts to be periodically transferred from one carrier tray to another and at the same time inverted incident to progression by the conveyor.

11. In apparatus for cooling articles of flat formation such as doughnuts and the like comprising an enclosure, an endless conveyor in said enclosure, guide sprockets determining a circuitous course for the conveyor, said conveyor having crosswise angle-section carrier trays with side flanges and transverse beads, said trays being adapted to turn the doughnuts over for periodic exposure of their opposite sides and said beads serving to prevent them from being crushed incident to angular separation and approach of the carrier trays in rounding the guide sprockets.

12. In apparatus for cooling articles of flat formation such as doughnuts and the like comprising an enclosure, an endless chain conveyor in said enclosure, guide sprockets determining a vertically-undulating course for the conveyor, said conveyor having crosswise angle-section carrier trays with side flanges and transverse bars, adapted to turn the doughnuts for periodic exposure of their opposite sides incident to progression through the apparatus, feed mechanism with means for receiving freshly cooked doughnuts from a producing machine and distributing them along the length of the carrier trays resting on one of their flat faces in definite separation upon successive presentation of said trays, and means for tilting the carrier trays for discharge of the doughnuts into receiving means at the outlet end of the enclosure.

13. In apparatus for cooling articles of flat formation such as doughnuts and the like comprising an enclosure, an endless conveyor in said enclosure, guide sprockets determining a vertically-undulating course for the conveyor, said conveyor having crosswise angle-section carrier trays with side flanges and transverse beads adapted to periodically turn the doughnuts over on their flat faces, feed mechanism including a slatted belt adapted to receive freshly cooked doughnuts from a producing machine, means moving transversely of the conveyor within the enclosure, a gravity chute for conducting the doughnuts from the belt aforesaid to the traversing means, and means associated with the chute for intermittently checking gravitation of the doughnuts and thereby maintaining them in definite separation enroute the transversely moving means for distribution along the length of the conveyor trays as the latter are successively presented.

HERBERT T. HUNTER.